United States Patent Office 3,294,742
Patented Dec. 27, 1966

3,294,742
HALOGEN-CONTAINING THERMOSETTING
EPOXY RESIN
Bart J. Bremmer, Midland, Mich., assignor to The Dow Chemical Company, Midland, Mich., a corporation of Delaware
No Drawing. Filed May 10, 1961, Ser. No. 108,993
7 Claims. (Cl. 260—47)

The invention concerns new compositions of matter and more particularly to relatively high molecular weight curable epoxy resin compositions containing halogen atoms which impart fire-retardant properties thereto. Such resins will be referred to broadly as being epoxy resins, both in the uncured and cured state, although no epoxide or oxirane groups generally exist in the completely cured resin.

There has long been a need for an epoxy resin of superior physical properties which also has superior fire-retardant properties and especially for such resin which is sufficiently fire-retardant to qualify as self-extinguishing in accordance with A.S.T.M. Test 635–56T. Broadly the term "self-extinguishing" means not combustible in the absence of direct continuous contact with an open flame.

A number of attempts have been made to impart fire-retardant properties to epoxy resins. For example, some chlorine has been left on the alkane carbon atoms of a glycidyl ether of a polynuclear bisphenol when reacting such bisphenol with epichlorohydrin, by only partially dehydrohalogenating the chlorohydrin ether formed in the reaction.

Full benefit of the halogen atoms in imparting fire-retardant properties to epoxy resins appears to remain unrealized when the halogens are attached only to the alkane carbon atoms comprising the carbon chain of the epoxy resins. It has also been observed that an epoxy resin wherein only halogenated bisphenols are employed is not economical and mere physical mixtures of epoxides of halogenated bisphenols and unhalogenated bisphenols are not fully satisfactory.

The principal object of the invention is to produce a self-extinguishing epoxy resin of high physical properties without accompanying adverse effects on desirable physical properties and which can be economically produced without appreciable outlay beyond conventional epoxy resin-making equipment.

A related object is to provide a new polymer containing a controlled proportion of halogenated phenolic groups therein. Other objects of the invention are to provide a resin composition which, in the uncured state, is less viscous and has longer pot life and which, in the cured state, is more resistant to acid attack and has greater strength and flexural properties than is commonly found in resins having some resistance to burning. How the invention attains these and related objects is made clear in the ensuing description and is defined in the appended claims.

We have now discovered that, by reacting a bisphenol preferably a brominated bisphenol, e.g., isopropylidene-bis(2,6-dibromophenol), with an epoxy novolac, a polyepoxide, a diepoxide, or diepoxide ether or higher molecular weight diepoxide polyether, prepared by epoxylating a polyhydroxy alcohol or polyhydroxy phenol, or of such polyhydroxy alcohol or phenol previously halogenated (necessarily brominated if the bisphenol is not), in amounts which provide at least about 12 percent by weight of bromine in the cured resin (but which do not provide an excess of phenolic hydroxyl groups over the oxirane groups present in the epoxide or epoxide ether), a self-extinguishing resin of superior physical properties is produced. In practicing the invention, it is to be observed that the ratio of phenolic hydroxy groups to oxirane groups must be less than 1. When an epoxy novolac (as hereinafter more fully described) is employed, the ratio of hydroxyl groups on the bisphenol to the oxirane groups of the epoxy novolac should be between 0.1 and 0.25.

The invention, accordingly, is (I) a new composition consisting of the reaction product of (A) a polyepoxide including simple or unetherized diepoxides, diepoxide ethers, higher molecular weight diepoxide polyethers, novolac polyepoxide ethers, and such di- and polyepoxides and ethers thereof containing halogen substituents, (B) a bisphenol (at least one of (A) or (B) having bromine substituents attached directly to a phenolic nucleus), and (C) a hardening agent, e.g., an amine, (II) the resulting cured resin, and (III) a method of making such resin. Reactants (A) and (B) identified above, are employed in a ratio to provide an excess of (A). A ratio which provides between 0.1 and 0.9 equivalent weight of phenolic hydroxyl groups per equivalent of oxirane groups is preferred. The (A) and/or (B) reactants containing bromine-substituted phenolic rings must be employed in an amount sufficient to provide at least about 12 percent by weight of bromine in the cured resin composition. Hardening agent (C) is preferably one which enters into chemical reaction with reactants (A) and (B) to form cross-links and is employed in an amount sufficient to provide between about 0.5 and 1.5 equivalent functional atoms per oxirane group and preferably substantially the equi-equivalent amount thereof. For example, an amine which provides about one equivalent amine hydrogen atoms per oxirane group is preferred.

The time required for cure, i.e., to convert the deformable composition to a thermoset solid resin, varies with the specific components, the amounts thereof employed, and the temperature of cure. Although a temperature of from room temperature, or below, up to about 200° C. may be employed, the temperature recommended is between about 50° C. or somewhat higher, up to about 120° C.

It is to be understood that the resin composition of the invention may also be made by reacting a tetrabromobisphenol with a halogenated phenol or diepoxide or diepoxide ether of a polyhydric phenol as well as by reacting it with an unhalogenated polyepoxide, polyepoxide ether, or diepoxide ether. It is also understood that an unhalogenated bisphenol may be employed with a brominated diepoxide or diepoxide ether and further understood that a mixture of a brominated bisphenol and an unhalogenated bisphenol may be reacted with a polyepoxide or diepoxide ether (which may or may not be halogenated) to provide the composition of the invention, so long as sufficient brominated phenol or brominated polyepoxide or brominated polyepoxide ether is present to provide at least about 12 percent by weight of bromine in the final cured resin.

"Bisphenol," as the term is used herein, refers to methyl diphenol and alkylidene and cycloalkylidene diphenols, illustrative of which are 4,4-isopropylidenediphenol, known as bisphenol A; 4,4'-isobutylidenediphenol, known as bisphenol B; 4,4'-methyldiphenol, known as bisphenol F; and cyclohexylidenediphenol. The term, "halogenated bisphenol" refers to any such bisphenol having halogen atoms attached directly to carbon atoms of a phenolic nucleus. The term "diepoxides" as used herein, includes epoxides having somewhat less than an average of 2 oxirane groups per molecule, e.g., those having from 1.5 to 2 oxirane groups per molecule. For simplicity of expression the term hereinafter will sometimes be used to mean both the simple diepoxides and diepoxide ethers and polyethers. Of the diepoxide ethers and higher mo-

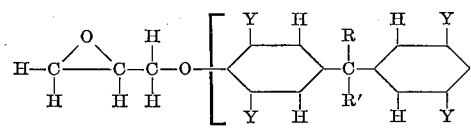

lecular weight diepoxide polyethers useful in the invention, the following are illustrative:

(1) The diepoxide ether of polyoxypropylene glycol having the formula:

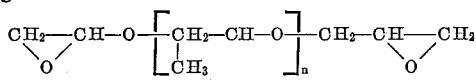

wherein $n$ is from 0 to about 40.

(2) The diepoxide ether of a bisphenol including higher molecular weight polyethers having the formula:

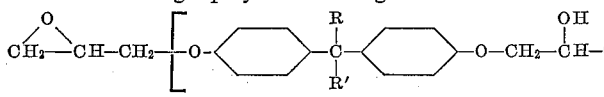

wherein R is H or $CH_3$ and R' is H, $CH_3$ or $C_2H_5$ and $n$ has a value of from 0 to about 10. The diepoxide ethers and polyethers employed usually have an epoxide equivalent weight (i.e., a weight of resin necessary to yield 1 equivalent oxirane group) of from about 174 to about 1000; D.E.R. 332, having an epoxide equivalent weight of 174–179, and D.E.R. 664, having an epoxide equivalent weight of between 875 and 975, is illustrative; an epoxide equivalent weight of less than 575, e.g., that of D.E.R. 661, is preferred, (3) An epoxy novolac having the formula:

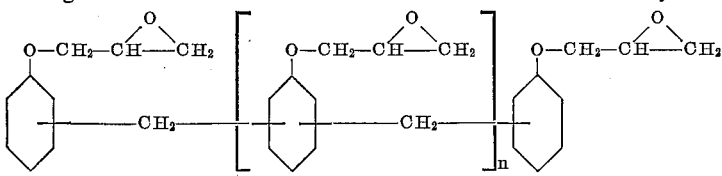

wherein $n$ may vary from 0 to about 4, but is usually 1 or 2. In practice, when an epoxy novolac is employed, $n$ usually has an average value of from 0.5 to 2.5, and more often of 1.2 to 1.4, thereby making a usual total average number of oxirane groups per molecule of from 3.2 to 3.4.

The unetherized epoxides for use in the practice of the invention include well known diepoxides among which are vinylcyclohexene dioxide and dicyclodiepoxycarboxylates, illustrative of the letter being 3,4-epoxy-6-methylcyclohexylmethyl - 3,4 - epoxy - 6 - methylcyclohexanecarboxylate having the formula:

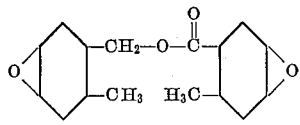

A simple or unetherized diepoxide may be prepared by known methods, one of which consists broadly of reacting a diolefin, e.g., vincyclohexadiene, with an oxidizing agent, e.g., peracetic acid.

The brominated bisphenol which is reacted with the polyepoxide usually has the general formula:

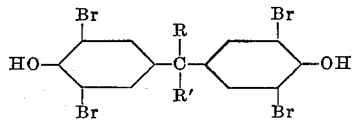

wherein R and R' independently represent H or the lower alkyl group indicated above.

The composition resulting from the reaction of (A) and (B), as defined above, has the following formula:

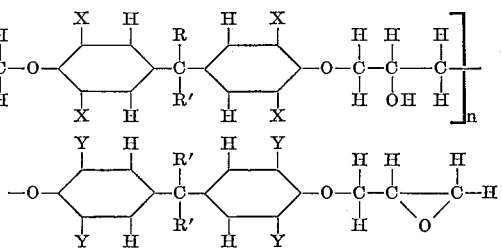

wherein $n$ has a value of from 0 to about 10, R and R' have the significance set out above and at least one of X or Y is Br, to provide at least about 12 percent by weight of bromine, and the other is either H or Cl. The invention may be carried out in a one- or two-stage procedure.

The two-stage procedure employs a polyepoxide ether of a glycol or polyhydric phenol with the brominated bisphenol substantially as follows: A diepoxide ether of a glycol or a polyglycol is prepared by first reacting the

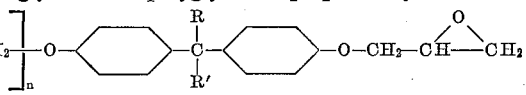

glycol or polyglycol with epichlorohydrin in the presence of a Lewis acid catalyst to produce chlorohydrin and thereafter dehydrochlorinating the chlorohydrin to reform oxirane groups. Generally a polyepoxide ether of a polyhydric phenol is prepared by admixing epichlorohydrin with the phenol, e.g., 4,4'-isopropylidenediphenol, in a 4 to 6 molar excess of the epichlorohydrin, and adding NaOH slowly thereto until a slight molar excess thereof is added. The higher molecular weight polyethers are usually prepared by either adding epichlorohydrin slowly to a mixture of polyhydric phenol and

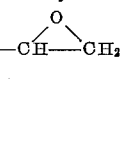

NaOH up to a molar ratio of epichlorohydrin to phenol of not over about 2 and frequently less than 1, or adding a polyhydric phenol to the lower molecular weight diepoxide ether prepared above.

According to the two-stage procedure, the brominated bisphenol and the diepoxide ether and/or polyether are admixed in a suitable reaction vessel, provided with heating and evacuating means, stirrer, thermometer, and nitrogen gas inlet. The contents of the vessel are stirred and heated to a maximum temperature of between about 60° and 10° C. to provide a substantially homogeneous mixture. It is thereafter cooled to between about 50° and 90° C. and an epoxylating catalyst, e.g., a tertiary amine, admixed therewith. The second stage consists of slowly raising the temperature (at a rate of less than 5° C. and preferably about 2° C. per minute) to a temperature between about 120° C. and about 180° C., preferably about 165° C. and held at that temperature for about 5 to 25 minutes, usually about 10 minutes, and thereafter, without cooling, applying a vacuum, e.g., one of about 2 mm. of Hg or less, for about an additional 15 minutes to remove volatile materials. Nitrogen gas is then allowed to flow in until at least about normal pressure and temperature are established. The resinous produce so made is then removed.

According to the one-stage procedure, the brominated bisphenol and NaOH, the latter as an aqueous solution and preferably in about an equimolar proportion to the bisphenol, are placed in a suitable reaction vessel, provided with a refluxing column and heating and stirring means, and heated to between about 80° and 100° C. until the bisphenol is fully dissolved in the aqueous solution of NaOH. The solution so made is then usually cooled until some of the bisphenol tends to precipitate which is below about 45° C. and epichlorohydrin, dissolved in an inert organic solvent, is added rapidly thereto. The epichlorohydrin is employed in an amount sufficient to provide between about 0.55 (at least in excess of 0.5) and 2.0 oxirane groups per hydroxyl group in the bisphenol. The resulting mixture is then heated again to between about 80° and 100° C., accompanied by stirring. The stirring is then stopped and the mixture allowed to stratify, whereby the aqueous layer becomes the top layer and the resin composition becomes the lower layer. Separation is then effected by known separation means and the resin washed with water until it is substantialy free of OH and Cl ions. It is then dried, at, say about, 160° C., preferably at a reduced pressure.

Examples 1 to 16 below illustrate the practice of the invention employing the two-stage process.

EXAMPLE 1

1,011 pounds of the diglycidyl ether of bisphenol A having an epoxide equivalent weight of 186 were placed in a 300-gallon reaction vessel of the type above described. Stirring was started, a nitrogen gas blanket provided, and heat applied to raise the temperature of the contents of the vessel to 70° C. 489.5 pounds of tetrabromobisphenol A were then charged into the reaction vessel and intermixed with the diglycidyl ether therein. The reaction mixture was then heated to 104° C., while being continually stirred, and maintained at that temperature until a substantially homogeneous reaction mixture was obtained. Thereafter, the contents of the vessel were cooled to 70° C. and about 2.8 pounds of triethylamine were admixed with the contents of the vessel. The temperature was again raised to about 105° C., and thereafter allowed to continue to rise, due to the exothermic heat of reaction, to a temperature of about 145° C. (The triethylamine is added for the purpose of improving the epoxylation process and is insufficient to effect a cure, i.e., convert the composition to a thermoset resin.) The reaction mixture was then further heated to 165° C. and held at that temperature for about 30 minutes while a vacuum was applied to remove volatiles from the reaction vessel. The vessel was then cooled to room temperature and the resinous product thus made removed therefrom. The product was analyzed and showed the following properties:

| Property | Value |
|---|---|
| Epoxide equivalent | 476 |
| Durran's softening point ° C | 73.5 |
| Percent Br (calculated) | 19.2 |
| Percent Br (determined) | 18.7 |
| Hydrolyzable chlorine percent | 0.10 |
| Molecular weight | 964 |
| Specific gravity | 1.3974 |
| Yield lbs | 1485 |
| Theoretical yield lbs | 1500 |
| Percent yield | 99 |

A portion of the resin so made was dissolved in methyl ethyl ketone (MEK) to produce an 80% solution thereof, calculated on the weight of non-volatiles in the resin. The MEK solution showed the following properties.

| Property | Value |
|---|---|
| Absolute viscosity, at 25° F. cps | 3,120 |
| Gardner viscosity, at 25° F. | Y–Z |
| Gardner color | 6–7 |

EXAMPLE 2

886 pounds of a diglycidyl ether of bisphenol A having an epoxide equivalent weight of 189 were placed in a reaction vessel of the type above described, heated to about 70° C., and 618 pounds of tetrabromobisphenol A admixed therewith. The temperature was then raised to 100° C., accompanied by stirring. When the mixture was substantially uniform, the temperature was dropped and about 2.8 pounds of triethylamine were admixed with the contents of the vessel. The temperature was again raised to about 100° C. and allowed to continue to rise, due to exothermic effects, to about 115° C. It was thereafter further raised to about 180° C. The flow of nitrogen gas was then discontinued and a vacuum applied to the vessel for 45 minutes while the contents thereof were held at between 175° and 185° C.; it was then cooled. The resin thus made was analyzed and shown to possess the properties set out in the table below.

| Property | Value |
|---|---|
| Epoxide equivalent weight | 751 |
| Durran's softening point ° C | 101 |
| Percent Br (calculated) | 24.2 |
| Percent Br (determined) | 25.3 |
| Hydrolyzable chlorine percent | 0.12 |
| Molecular weight | 1340 |
| Specific gravity | 1.4410 |
| Yield lbs | 1495.5 |
| Theoretical yield | 1505 |
| Percent yield | 99.2 |

Portions of the resin so made were admixed with MEK to give the percent solids, based on the non-volatiles, set out below. The MEK solution possessed the following characteristics:

| Percent nonvolatile solids in MEK | Properties and Values Obtained | | |
|---|---|---|---|
| | Absolute Viscosity at 25° C., cps. | Gardner Viscosity | Gardner Gardner Color |
| 80 | 19,200 | | |
| 75 | 3,700 | X–Y | 6–7 |
| 70 | 650 | P–Q | 6–7 |

Portions of the resin composition prepared in Example 1 above were admixed with various curing or hardening agents set out in Examples 1–A to 1–D below:

EXAMPLE 1–A

To one portion of the resin composition of Example 1 were admixed 3 parts per 100 parts by weight of resin composition, of BF$_3$:monoethylamine complex. The resulting curable mixture was admixed with acetone in an amount of about 50% for use in impregnating cloth. The cloth employed was #181 style, Volan A finish. Substantially equal size sections of the cloth were impregnated and laid in tiers or "nested" according to known practice, to make a 12-ply laminate. The resin constituted 42.4 percent by weight of the weight of the laminate as assembled. The laminate was placed in an oven at about 163° C. for 8 minutes. The resin was somewhat tacky but the laminate could then be easily handled. It was then placed in a press under a pressure of 40 pounds per square inch (p.s.i.) and cured at 325° F. (ca. 163° C.) for 1 hour. About 9.9 percent of the resin was caused to exude from the laminate leaving a resin content of 32.5 percent by weight of resin. The laminate was then post cured at 350° C. (ca. 177° C.) for 2 hours. The laminated cloth article so made was 108 mils (0.108 inch) thick. It was flexible and possessed good drop characteristics. It was subjected to standard A.S.T.M. tests and gave the values set out below:

| Test | Value |
|---|---|
| Flexural strength at 75° F. (ca. 24° C.) | 85,500 p.s.i. |
| Flexural strength at 300° F. (ca. 149° C.) | 12,800 p.s.i |
| Wet flexural strength (after 2 hrs. in boiling H$_2$O) | 79,000. |
| Edgewise compression strength | 52,000. |
| Tensile strength | 51,300. |

Tensile modulus _____ $1.2 \times 10^6$.
Electrical property: volume resistivity for 1 minute (condition A) ___ $1.4 \times 10^{14}$ ohm-cm.
Percent water absorbed (2 hrs. in boiling water) _____ 0.217.
Flammability _____ Self-extinguishing.

EXAMPLE 1–B

To a second portion of the resin of Example 1 was admixed a combined hardening agent consisting of 5.2 parts by weight of methyl nadic anhydride, 28 parts by weight of hexahydrophthalic anhydride, and 2 parts by weight of benzyldimethyl amine per 100 parts of resin. The curable mixture was admixed with acetone to make a 50 percent by weight composition suitable for impregnating cloth. Sections of the same cloth employed above were impregnated and laid in tiers to make a 14-ply laminate. The resin comprised 37.6 percent of the weight of the laminate as assembled. The resin laminant gelled in 100 seconds. The laminate was then placed in a press, subjected to a pressure of 100 p.s.i. and heated at 325° F. for 0.5 hour followed by a post cure of 16 hours at 325° F. The laminated article was 145 mils thick and made up 36.4 percent of the finished laminate. The laminated article was strong and flexible. It was tested according to standard A.S.T.M. tests and gave the values set out below:

Flexural strength at 75° F. _____ 81,370 p.s.i.
Flexural strength at 300° F. (1 hour) _____ 9,170 p.s.i.
Wet flexural strength (after 2 hours in boiling water) _____ 76,860.
Edgewise compressive strength ____ 66,800.
Tensile modulus _____ $1.2 \times 10^6$.
Flammability _____ Self-extinguishing.

EXAMPLE 1–C

A third portion of the resin composition of Example 1 was admixed with methylene dianiline in an amount of 10.5 parts per 100 parts of resin composition. The resulting mixture was admixed with acetone to make a 50 percent by weight fluid composition especially suitable for impregnating purposes. Sections of the same 181 style, Volan A cloth employed above were impregnated with the acetone-resin composition and laid in tiers to make a 12-ply laminate. The resin comprised 37 percent by weight of the laminate as made. The laminate was placed in 325° F. temperature. The resin laminant gelled in 5 minutes. The laminate was then press-cured at 325° F. at a pressure of 60 p.s.i. for 1 hour and thereafter given a post cure of 2 hours at 350° F. The final laminated cloth article was 107 mils thick and has a resin content by weight of 31 percent. The laminate was tested and showed the following results:

Flexural strength at 75° F. _____ 95,200 p.s.i.
Flexural strength at 300° F. _____ 12,700 p.s.i.
Wet flexural strength (after 2 hours in boiling water) _____ 88,000 p.s.i.
Edgewise compression strength ____ 55,000 p.s.i.
Tensile strength _____ 48,500 p.s.i.
Tensile modulus _____ $1.22 \times 10^6$.
Electrical properties: volume resistivity for 1 minute (condition A) $5.6 \times 10^{13}$ ohm-cm.
Flammability _____ Self-extinguishing.

EXAMPLE 1–D

Another portion of the resin composition prepared in Example 1 was admixed with dicyandiamide in an amount by weight of 6 parts per 100 parts of the resin composition. Cloth sections were impregnated and a laminated cloth article was made similarly as above described and tested. It showed comparable properties to the articles cured above and was particularly marked in its resistance to burning according to A.S.T.M. Test D–635–56T.

Examples 3 to 15 of the invention were run, following generally the two-stage procedure employed in the preceding examples. Bisphenol A and a diepoxide ether were heated, with stirring, to about 110° C. to obtain a substantially uniform mixture and then cooled to about 80° C. Between about 0.1 and about 0.5 percent of triethylamine was then admixed therewith. The reaction mixture was then raised to about 165° C. and, after about 25 minutes at that temperature, during the last portion of which a vacuum was applied to remove volatile material, the mixture was cooled and the vessel swept out with nitrogen gas. The resin so made was then removed and tested. The ingredients and amounts thereof employed, together with physical properties of the uncured resin, are set out in Table I below:

*Table I*

| Example Number | Polyhydric Phenol | | Diepoxide or Ether | | Physical Properties | | | | | |
|---|---|---|---|---|---|---|---|---|---|---|
| | Type | Amount in grams | Type | Amount in grams | Epoxide Equiv. Wt. | | Durran's Softening Point | Percent Br | Gardner Values | |
| | | | | | Calculated | Actual | | | Of 75 Color | In MEK Viscosity |
| 3 | Tetrabromobisphenol A. | 27.2 | Diglycidyl ether of tetrabromo bisphenol A. | 350 | 420 | 449 | 79.1 | 47.1 | 10–11 | A |
| 4 | ___do___ | 54.2 | ___do___ | 350 | 506 | 538.2 | 90.6 | 47.8 | 10–11 | C |
| 5 | ___do___ | 108.8 | ___do___ | 350 | 765 | 787.8 | 114.5 | 49.0 | | |
| 6 | Bisphenol A | 22.8 | ___do___ | 350 | 466 | 497.6 | 87.5 | 43.5 | 8 | A–B |
| 7 | ___do___ | 34.2 | ___do___ | 350 | 550 | 582.9 | 98.2 | 42.4 | 8 | D–E |
| 8 | ___do___ | 45.6 | ___do___ | 350 | 677 | 688.8 | 103.6 | 40.7 | 10–11 | T–U |
| 9 | Tetrachlorobisphenol A. | 36.6 | ___do___ | 350 | 484 | 502 | 90.0 | [1] 42.6 | 10 | A |
| 10 | Tetrabromobisphenol A. | 81.6 | Epoxide 201 [2] | 150 | 330 | 374 | 86.3 | 20.0 | 12–13 | H |
| 11 | ___do___ | 108.8 | Diglycidyl ether of tetrachloro bisphenol A. | 285 | 655 | 706 | 94.0 | [3] 16.1 | 7–8 | S |
| 12 | ___do___ | 108.8 | ___do___ | 221 | 547 | 641.1 | 102.1 | 19.1 | 5–6 | Y |
| 13 | ___do___ | 81.6 | Diglycidyl ether of resorcinol. | 128 | 299 | 310 | 39.7 | 22.5 | 8–9 | |
| 14 | Bisphenol A | 34.2 | Diglycidyl ether of 4,4'-cyclohexidene bis (2,6-dibromophenol). | 452 | 695 | 826.5 | 103.5 | 38.7 | 14 | F–G |
| 15 | ___do___ | 34.2 | Diglycidyl ether of tetrabromobisphenol. | 371.6 | 580 | 612.4 | 92.1 | 41.7 | 14–15 | D–E |

[1] +4.21% Cl.
[2] Epoxide 201 is 3,4-epoxy-6-methylcyclohexylmethyl-3,4-epoxy-6-methylcyclohexanecarboxylate.
[3] +21.7% Cl.

The uncured resins of Table I are more readily diluted in organic solvents than known epoxy resins, thereby providing low viscosity compositions for more convenient application. Representative specimens of resins of the type made by curing the resin compositions of Table I were strong, flexible, and self-extinguishing.

EXAMPLE 16

To show the use of an epoxy novolac in the practice of the invention, 177 grams (providing 1 gram equivalent) of an epoxy novolac, having an average of between 3.2 an 3.4 oxirane groups per molecule, and 68.1 grams (providing 0.25 gram equivalent) of tetrabromobisphenol A were admixed in a suitable reaction vessel provided with thermometer, condenser, nitrogen gas inlet, and heating and stirring means. The vessel was flushed out with nitrogen gas and the contents then brought to 165° C. over a period of 1 hour, the stirrer then started, and the contents then held at that temperature for 3 hours, maintaining moderate stirring. The resin of the invention was thereby formed. The vessel was cooled and the resin removed as a brittle solid. The resin had a Durran's softening point of 92.0° C. and a bromine content of 16.3 percent. The resin was subsequently remelted and portions thereof admixed with such hardening agents as primary and secondary amines or dicarboxylic acids in amounts sufficient to provide about 1 reactive hydrogen or carboxyl group (dependent on the hardening agent used) per oxirane group present. Thermoset resins of good strength and flexibility and which were self-extinguishing can be made by admixing amine type or dicarboxylic acid type hardening agents with the reaction product of epoxy novolacs and a brominated bisphenol as was made in this example. The cured resins so made have excellent strength and flexural properties and are self-extinguishing. A number of curing agents may be used, e.g., cured epoxy novolac resins customarily result in a heat distortion temperature of from 40 to 50 centigrade degrees above that of cured epoxy resins which are made by employing a bisphenol. This desirable physical characteristic of epoxy novolac resins is due to the higher functionality thereof.

If desired, a catalyst for epoxylation may be employed in the reaction mixture of the epoxy novolac and brominated bisphenol. A catalyst recommended is a tertiary amine, e.g., triethyl amine, in amounts up to 2 percent by weight of the reaction mixture. The catalyst is conveniently removed at the close of the reaction period by vacuum distillation. Best results are obtained, when a bisphenol and an epoxy novolac of the type employed in Example 16 are present in an amount to provide between 0.1 and 0.25 equivalent hydroxyl groups in the bisphenol per equivalent oxirane group in the epoxy novolac. When an epoxy novolac having an oxirane functionality of less than 3.2 is used, a higher ratio of hydroxyl provided by the bisphenol may be employed, and, on the other hand, when an epoxy novolac having an oxirane functionality of more than 3.4 is used, a lower ratio of hydroxyl groups may be employed.

EXAMPLES 17–18

Examples were run according to the one-stage procedure described above. In these examples, a charge of the bisphenol and an aqueous solution of NaOH was put in a reaction vessel equipped, as required, for heating and refluxing. The charge was heated while being stirred, at about 80° C., to dissolve the bisphenol in the aqueous solution. It was thereafter cooled to below about 45° C. and epichlorohydrin, in some instances admixed with an inert solvent, admixed therewith. The resulting mixture was refluxed, while being stirred, at about 80° C. for about 80 minutes. Stirring was then discontinued whereupon the contents of the vessel stratified into an upper aqueous layer and a lower organic layer containing the epoxylated bisphenol. The lower layer was separated and water-washed until it was substantially free of Cl and OH ions.

The reactants, the amount employed, and properties of the uncured resin obtained are set out in Table II.

*Table II*

| Example Number | Polyhydric Phenol | | NaOH in grams [1] | Epichloro-hydrin in grams | Organic solvent in grams | Physical Properties | | | | |
|---|---|---|---|---|---|---|---|---|---|---|
| | Type | Amount in grams | | | | Epoxy Equivalent weight | Durran's S.P.,° C. | Gardner | | |
| | | | | | | | | Br | Color | Vis |
| 17 | Tetrabromobisphenol A. | 272 | 38.2 | 83.25 | Toluene, 50 | 731.5 | 88.8 | 47.9 | 9–10 | B–C. |
| 18 | Bisphenol A.<br>Tetrabromobisphenol A. | 85.5<br>68.0 | 31.4 | 69.4 | ___do___ | 664.4 | 91.7 | 21.1 | 11–12 | T–U. |

[1] Actual weight of NaOH added as a substantially 10 percent by weight aqueous solution.
[2] All resins were self-extinguishing according to A.S.T.M. Test D635-56T.

Reference to Table II shows that resins of the invention made according to the one-stage procedure possess good strength properties, have excellent Durran's softening point values, and are self-extinguishing.

The uncured resin of the invention has been shown to have a lower viscosity in organic solvents, longer pot life, and better acid resistance than conventional resins.

The cured resin of the invention compares favorably with known epoxy resins in strength and flexural properties. In addition thereto, the cured resin is self-extinguishing and has better resistance to corrosivity when in contact with aqueous acid solutions. The species employing the epoxy novolac resins have a desirably high heat distortion value appreciably above that of comparable epoxy resins.

Having described my invention, what I claim and desire to protect by Letters Patent is:

1. A composition of matter consisting of the reaction product of component (A) a polyglycidyl ether having the formula:

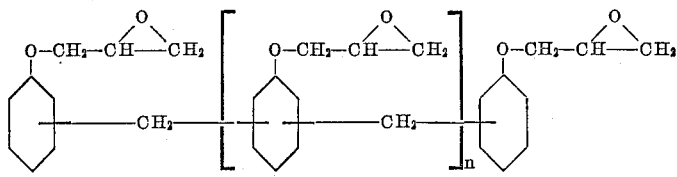

wherein $n$ may vary from 0 to about 4, and component (B) 2,2-bis(3,5-dibromo-4-hydroxyphenyl)propane, at least 1 of components (A) and (B) containing bromine substituents directly attached to a phenolic nucleous thereof, in an amount by weight of components (A) and (B) to provide at least 0.1 and less than 1.0 equivalent weight of hydroxyl groups of component (B) per equivalent weight of oxirane groups of component (A) and a sufficient amount of the component containing bromine-substituted phenolic nuclei to provide at least 12% bromine by weight of said composition.

2. The composition of claim 1 wherein component (A) contains an average of between about 3.2 and 3.4 oxirane groups per molecule.

3. The composition of claim 1 wherein the ratio of hydroxyl groups in the 2,2-bis(3,5-dibromo-4-hydroxyphenyl)propane is between 0.1 and 0.25 equivalent weight per equivalent weight of oxirane groups present in said polyglycidyl ether of novolac.

4. A durable, high strength self-extinguishing resin comprising the heated mixture of the composition of claim 1 and a hardening agent which effects cross-linking of residual oxirane groups which have not reacted with hydroxyl groups selected from the class consisting of primary, secondary and tertiary aliphatic and aromatic amines, dicarboxylic acids and the anhydrides thereof, and boron trifluoride and complexes thereof wherein the complexing agent is selected from the class consisting of amines, glycols, and ethers.

5. The method of making a self-extinguishing thermoset resin having high strength and corrosion-resistant properties consisting essentially of admixing component (A) a polyglycidyl ether having the formula:

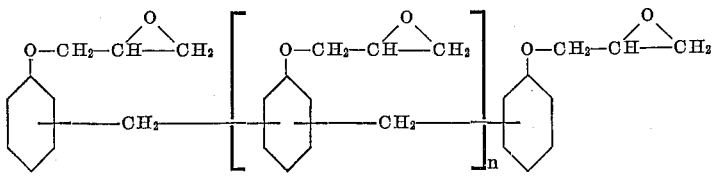

wherein $n$ may vary from 0 to about 4, and component (B) 4,4'-isopropylidenediphenol, at least one of components (A) and (B) containing bromine substituents attached directly to a phenolic nucleus thereof, and components (A) and (B) being employed in an amount sufficient to provide at least 0.1 but less than 1.0 equivalent weight of hydroxyl groups of component (B) per equivalent weight of oxirane groups of component (A), and the component which contains the bromine-substituted phenolic nuclei being present in an amount sufficient to provide at least about 12 percent bromine in the resin composition when subsequently cured; heating the reaction mixture at between about 80° and about 110° C. until it is substantially homogeneous; cooling the mixture to between about 50 and 90° C. and admixing therewith between about 0.1 and 0.5 percent by weight of a tertiary amine, while stirring; thereafter increasing the temperature of the resulting mixture at a rate not in excess of about 5 centigrade degrees per minute until an advanced temperature of between about 120° and 180° C. is reached and holding at that temperature for from about 5 to about 25 minutes; applying a partial vacuum, while holding at the advanced temperature, to remove the tertiary amine; flushing with an inert gas while resuming atmospheric pressure; and cooling the resulting resinous mass but, while still fluid, admixing therewith a hardening agent selected from the class consisting of primary and secondary aliphatic and primary amines, dicarboxylic acids and anhydrides thereof, and boron trifluoride and complexes thereof, wherein the complexing agent is selected from the class consisting of amines, glycols, and ethers, said hardening agent being employed in an amount sufficient to effect cross-linking of residual oxirane groups remaining unreacted with hydroxyl groups in said resinous mass and subjecting the resin containing the hardening agent to sufficient heat to convert it to a self-extinguishing thermoset resin.

6. The method according to claim 5 wherein said resulting resinous mass prior to admixing therewith said hardening agent is cooled to a solid, the solid so made admixed with and dissolved in a liquid hydrocarbon solvent prior to admixing said hardening agent therewith, and thereafter the liquid hydrocarbon solvent containing the resin and hardening agent subjected to sufficient heat to volatilize off the liquid hydrocarbon solvent and effect cross-linking and conversion of the resultant mass to a self-extinguishing thermoset resin.

7. The method according to claim 6 wherein the liquid hydrocarbon solvent is toluene.

References Cited by the Examiner

UNITED STATES PATENTS

| | | | |
|---|---|---|---|
| 2,615,008 | 10/1952 | Greenlee | 260—47 |
| 2,658,884 | 11/1953 | D'Alelio | 260—47 |
| 3,016,362 | 1/1962 | Wismer | 260—47 |
| 3,058,946 | 10/1962 | Nametz | 260—2.5 |
| 3,093,599 | 6/1963 | Mueller-Tamm et al. | |

OTHER REFERENCES

Lee et al.: Epoxy Resins, McGraw-Hill Book Co., N.Y. (1957), pages 17 and 25 relied on.

SAMUEL H. BLECH, *Primary Examiner.*

HAROLD BURSTEIN, LOUISE P. QUAST, *Examiners.*

P. H. HELLER, T. D. KERWIN, *Assistant Examiners.*